May 8, 1928. 1,669,405
O. J. DANSEREAU
BROACHING MACHINE
Filed Aug. 31, 1921 3 Sheets-Sheet 1
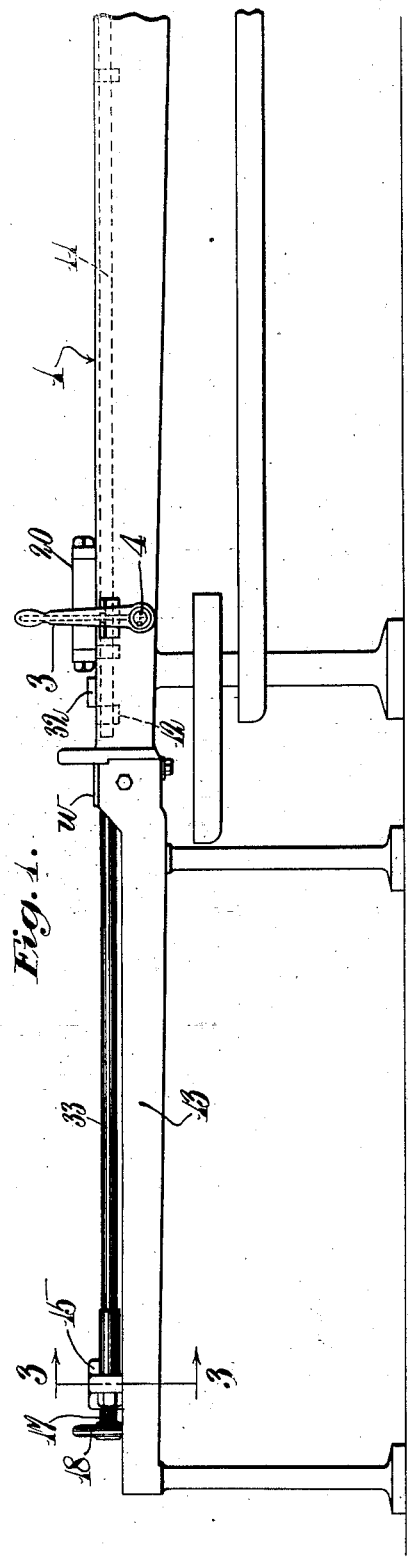
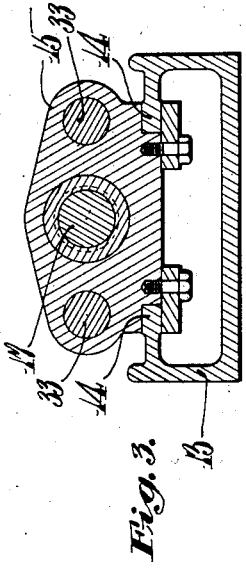
Inventor:
Omer J. Dansereau.
by
Atty.

May 8, 1928.
O. J. DANSEREAU
BROACHING MACHINE
Filed Aug. 31, 1921
1,669,405
3 Sheets-Sheet 2
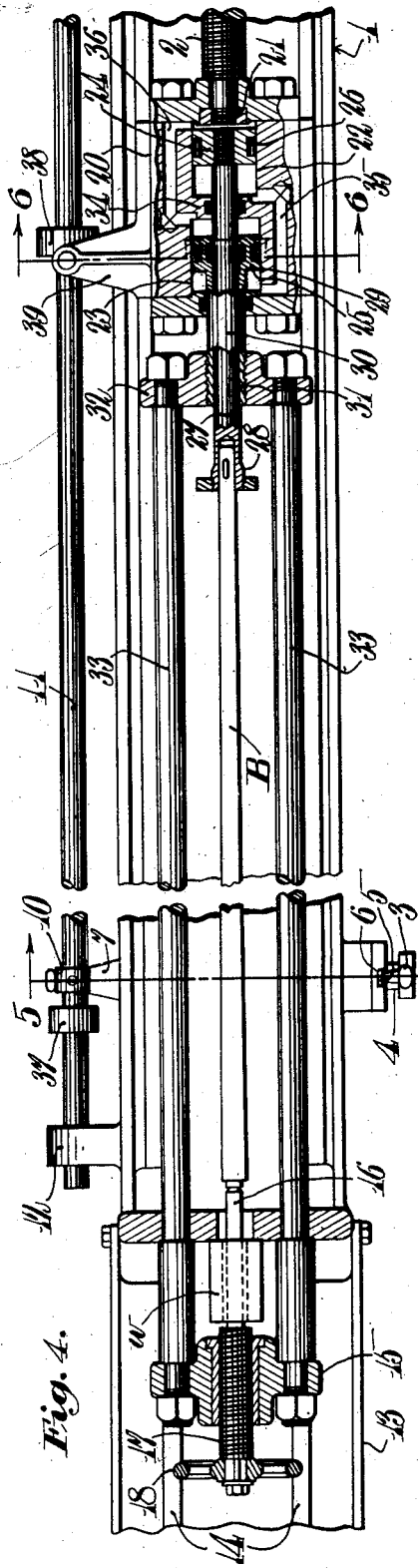
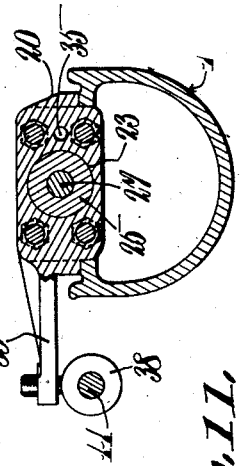
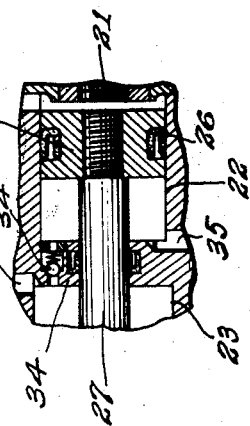
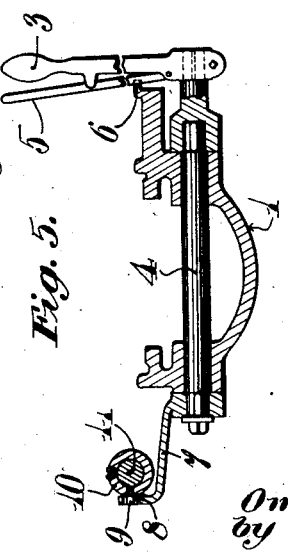
Inventor:
Omer J. Dansereau,
by
Atty.

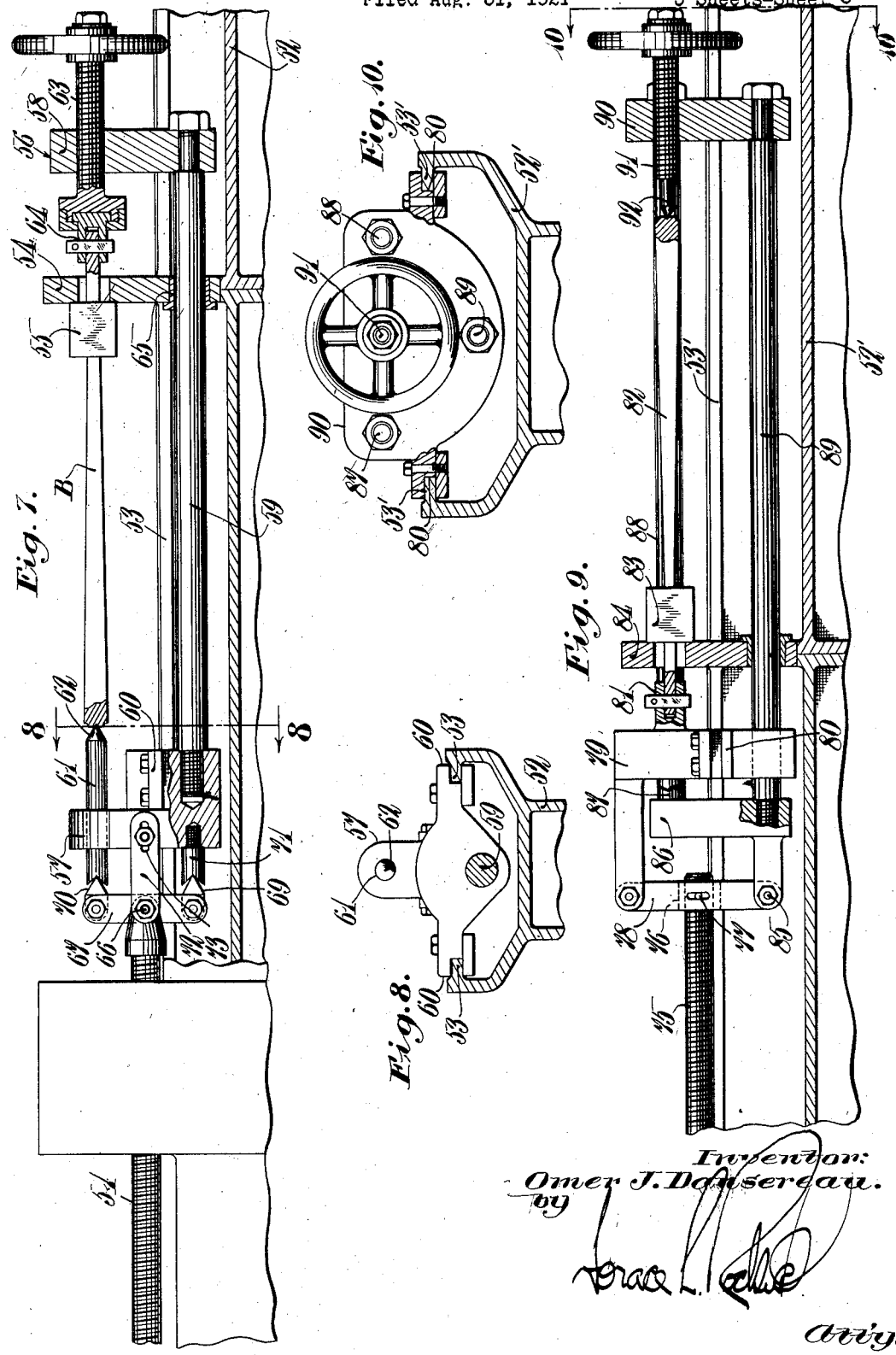

Patented May 8, 1928.

1,669,405

UNITED STATES PATENT OFFICE.

OMER J. DANSEREAU, OF CLAREMONT, NEW HAMPSHIRE, ASSIGNOR TO SULLIVAN MACHINERY COMPANY, A CORPORATION OF MASSACHUSETTS.

BROACHING MACHINE.

Application filed August 31, 1921. Serial No. 497,350.

My invention relates to broaching machines.

An object of my invention is to provide an improved broaching machine. Another object of my invention is to provide an improved broaching mechanism whereby the breaking of broaches may be materially reduced. A further object of my invention is to provide an improved broaching machine whereby, by the use of an ordinary traction screw, the force requisite to move a broach through a work-piece may be divided into substantially equal pushes and pulls. A still further object of my invention is to provide an attachment for broaching machines of the traction screw or other types whereby the broach moving force imparted by said screw may be applied equally to the opposite ends of the broach. A still further object of my invention is to provide an improved mechanism adapted for connection to broaching machines in which the force for moving the broach is customarily applied to said broach at one end whereby said force may be automatically divided and applied equally to said broach at both ends. Further objects of my invention will appear in the course of the following specification and appended claims.

In the accompanying drawings I have shown for purposes of illustration three forms which my invention may assume in practice.

In these drawings:—

Fig. 1 is a side elevation with parts broken away of a broaching machine embodying my improved mechanism.

Fig. 2 is a plan view of a portion of the mechanism shown in Fig. 1.

Fig. 3 is a transverse section on the line 3—3 of Fig. 1.

Fig. 4 is an enlarged plan view with parts broken away and parts shown in central horizontal section of portions of the structure disclosed in Fig. 2, the relative position of the parts, however, being different.

Fig. 5 is a transverse section on the line 5—5 of Fig. 4, the view being turned through 90°.

Fig. 6 is a transverse section on the line 6—6 of Fig. 4, the view being turned through 90°.

Fig. 7 is a modified form of equalizing means.

Fig. 8 is a section on line 8—8 of Fig. 7.

Fig. 9 is a further modified form of equalizing means.

Fig. 10 is a section on line 10—10 of Fig. 9.

Fig. 11 is an enlarged fragmentary detail view of the equalizing chambers, showing a modified means for passing fluid from one chamber to the other.

In the form of my invention shown in Figs. 1 to 6 and which I have provided for purposes of illustration, I have shown a well-known form of broaching machine which is generally designated by 1. This broaching machine comprises a traction screw 2 and well-known operating mechanism therefor which is not shown as it is unnecessary for the purposes of this application. The operating means which cooperates with the traction screw 2 is controlled by a manual lever 3, which lever is mounted upon a transverse shaft 4 and provided with a locking member 5 adapted to cooperate with a notch 6 disposed in the stationary member opposite said handle when the latter is in vertical or mid-position. The shaft 4 is provided at its end opposite the handle 3 with an arm 7 keyed thereto and the arm 7 has a slot 8 therein adapted to cooperate with a pin 9 projecting from a collar 10 which is secured to a rod 11 guided as indicated at 12 for movement relative to the frame 1, which rod 11 when moved toward the left in Fig. 4 operates to set in motion the driving mechanism for moving the screw 2 toward the right in that figure. Attached to the front end of the broaching machine is a trough-like frame 13 which is similar to the frame often used with such machines where it is desired to employ a cutter fluid during broaching operation, but differing therefrom somewhat in length and in that guides are provided as indicated at 14 to cooperate with the cross head 15 which carries a center 16 therewith, said center being adjustable by a screw 17 and hand wheel 18. The center 16 is adapted to engage in a recess in the rear end of a broach B. At the left hand end of the screw 2 there is provided a cross head member 20 which member is connected to said screw as illustrated at 21. This cross head 20, is chambered out in its interior to form two cylinder members 22 and 23, these cylinder members each containing a piston, the piston in the cylinder 22 being designated 24 and that in the cylinder member 23, designated 25. The piston 24 is provided with suitable packings 26 of well-known form and with a forwardly or leftwardly projecting piston rod 27 having arranged at the outer end thereof means designated 28 for the securing thereto by well known slot and key mechanism of the forward end of the broach B. The piston 25 has a suitable packing 29 and is also provided with a piston rod 30, said piston and rod being bored out as indicated at 31 to permit the piston rod 27 to pass coaxially therethrough. The left hand end of the rod 30 carries a cross head 32 which is connected by side rods 33 to the cross head 15 previously described.

Intermediate the cylinders 22 and 23 is a partition 34 through which the piston rod 27 passes, suitable hydraulic packing being provided therein. Passages are provided for the purpose of connecting the left hand ends of the cylinders 22 and 23 together and the right hand ends of these cylinders together, these passages being respectively designated 35 and 36. The space between the piston 24 and the left hand end of the cylinder 22 and the space between the piston 25 and the left hand end of the cylinder 23 and the passage 35 are filled with a substantially incompressible fluid such as oil and means is provided for automatically supplying additional oil to this space as may be necessary. It will be noted that the annular surfaces exposed to the liquid in the spaces just mentioned are equal on the pistons 24 and 25.

It will be noted that the rod 11 is provided with blocks or collars 37 and 38 and that the cross head 20 has an arm 39 adapted to engage the collar 38 and move the rod to the right and thereby move the handle 3 to vertical position (in which position it will be automatically held by the catch 5) at such time as the broach has completely passed through the work piece. It will also be noted that the member 39 will engage the collar 37 and shift the handle 3 from its right hand position to mid position when the screw has returned the parts to their extreme left hand position. It is desired to call attention to the following important points.

The space comprising the left hand ends of the cylinders 22 and 23 and the passage 35 may alone be filled with fluid pressure. In this event, vent ports will be arranged adjacent the right hand ends of the cylinders for the purpose of allowing any leakage which may occur past the pistons to escape. It will be possible, however, to substantially fill the chambers on both sides of the pistons with liquid allowing a small air space in each side. It will also be possible to substantially completely fill both chambers and to place a check valve controlled passage in the wall between the cylinders, the check valve 34' opening in a direction toward the cylinder 22 whereby no pressure can escape from the chamber 22 but additional fluid may be supplied thereto. In this event, were material leakage to have occurred from the left hand side of the piston to the right hand side, the original conditions could be restored by forcing the liquid from the right hand side of the cylinders 22 and 23 to the left hand side of the same in any suitable manner such as moving the pistons to the right relative to said cylinders when the broach is removed. It will thus be seen that any leakage from the left hand side of the pistons to the right hand side will be forced back again to the left hand side. For instance, fluid in the right hand end of the cylinder 22 will pass through the passage 36 and through the check valve 34' to the left hand end of cylinder 22, while the fluid in the right hand end of the cylinder 23 will pass directly through the check valve into the left hand end of the cylinder 22 from which the fluid may pass through the passage 35 to the left hand end of the cylinder 23. It must be understood, however, that in any case, the hand wheel 18 will be turned in such manner as to bring the center 16 solidly into contact with the recess in the left hand end of the broach before the pulling movement of the screw is begun, as it will be noted that since the parts will have moved to the left with no broach in position, each of the pistons will keep a position in the right hand ends of the cylinders. It will be clear that the only movement of the piston and cylinders relative to each other during traction operation of the screw 2 will result in a reduction in volume of the space containing the fluid under pressure.

From the foregoing description, the mode of operation of this device will be readily apparent. Let it be assumed that the work piece is in position as indicated at W against an abutment at the left hand end of the frame 1, that only the shank end of the broach has been passed through the work piece and is being held by a key in the member 28 and that the hand wheel has been turned to bring the center up into engagement with the recess in the rear end of the broach. Then as the cross head 20 begins to move to the right, the broach will tend to lag behind by reason of the work necessary to move it through the work piece and as a result both the pistons 24 and 25 will likewise tend to lag. As a result the cylinders will move relative to the pistons until the fluid to the rear of the pistons is under a pressure sufficient to cause the broach to begin to cut, thereafter the pistons would move simultaneously with the cross head to the right and the liquid which was subject to pressure acting upon equal areas of the pistons would cause each piston to play an equal part in the application of the force necessary to move the broach, that is, substantially equal pushes and pulls would be applied to the broach.

It will be evident that this mechanism could quite as well be used with a pushing broach instead of a traction broach, the only difference being that the parts for holding the broach would be reversed, the abutment for the work piece would be changed to the opposite end and the liquid which would act to equalize the pressure on the parts would be located in the right hand ends of the cylinders and the passage 36.

From the foregoing description, it will be clearly evident that I have provided means whereby an ordinary pulling and pushing type of broaching machine can be readily adapted to divide the forces acting to move the broach and equally apply them at opposite ends thereof. It will also be evident that this mechanism can be applied with a minimum of alteration to some commercial machines and entirely without change to others. It is also evident that substantially the same mechanism may be employed for either pulling or pushing type broachers by very minor changes and by changing the location of the fluid which is to transmit the pressure. It will be understood that a very high grade hydraulic packing will be employed on the pistons 24 and 25 and accordingly that leakage will be a minimum and in many instances, over long periods of time will be entirely absent.

It is evidently not necessary to employ a fluid pressure means for equalizing the push and pull upon the broach during its operation and mechanical means can instead be employed. For purposes of illustration I have shown in Figs. 7 and 8 one form of mechanical means which might be employed where it is desired to push the broach carrying mechanism relatively to the work and in Figs. 9 and 10 a traction screw device adapted to pull the broach carrying mechanism in the opposite direction; in each case, however, the actual reaction upon the broach being a combined push and pull.

It will be evident, considering first the form shown in Figs. 7 and 8, that a pushing screw 51 whose feeding is controlled by any suitable means, as for example that described in connection with the first form of my invention, is arranged in suitable relation to a frame member 52 which is in turn provided with guides 53 at its opposite sides and with an abutment member 54 upon which a work piece 55 may be supported during the broaching operation. Slidable on the guides 53 is a frame work generally indicated by 56, which frame work comprises a pair of members 57 and 58 connected by a rod 59, the first of these members being provided as indicated in Fig. 8 with guiding means 60 cooperating with the guides or gibs 53. Slidably mounted in the member 57 is a center 61 having a point 62 adapted to engage in a socket in the rear end of the broach. In threaded relation with the member 58 is a screw 63 having means as shown at 64 for connection to the front end of the broach B to pull thereon. The rod 59 is guided as indicated at 65 in the frame 52.

For the purpose of imparting uniform movement and force to the members 57 and 58, I provide a lever pivoted adjacent its center as indicated at 66, this lever being designated 67 and having pivoted thereto at equal distances from the pivot 66, heavy knife edges 69 and 70, which knife edges respectively engage sockets in the rear end of the center 61 and in a member 71 secured in the member 57. For the purpose of providing additional guiding for the lever, a link 72 having a sliding connection 73 with the member 57 is connected to the pivot 56.

The mode of operation of this mechanism will be readily apparent. A broach is inserted between the center point 62 and the member 64 and the screw 63 is adjusted so as to bring the parts into such relation that the broach is held in position when the lever 67 is substantially vertical. When the pushing screw 51 is suitably fed to the right, the entire mechanism is pushed bodily to the right in Fig. 7, the force applied to the lever 67 being evenly distributed between the knife edge 69 and 70, and the lever being permitted to tilt slightly to distribute the pressure absolutely uniformly upon the members cooperating therewith. Owing to the freedom of the center 61 to slide relative to the member 57, is will be evident that I have provided means for accurately equalizing the force needed to move the broach B through the work piece 55 between a push and a pull.

It will be evident that a traction screw might equally well be used and so that the carriage carrying the broach might be pulled instead of pushed. Means for accomplishing this function is disclosed in Figs. 9 and 10 in which 75 is a traction screw having a connection by means of a collar 76 and suitable projecting pins 77, or knife edges as may be preferable in some cases, with a lever 78 corresponding in general to the lever 67. This lever is pivotally connected at its upper end to a frame 79 which frame is guided as indicated at 80 by gibs 53' on a frame 52'. The member 79 is provided with suitable pulling means 81 for the front end of the broach 82 which passes through the work piece 83 supported against a stationary abutment 84. The lower end of the lever 78 is connected by a pivot 85 to a member 86 which is in turn connected by three side rods 87, 88 and 89 to a rear member 90 which supports an adjustable screw 91 having a center 92 adapted to engage the rear end of the broach. The several rods 87, 88, and 89 pass slidably through the member 79 and it is thus evident that relative movement between the rear head 90 and the front head 79 is readily possible. The mode of operation of this mechanism will be readily apparent. When the work piece 83 has been placed against the abutment and connected by the means 81 to the frame 79, the rear end of the broach is then brought into alinement with the center 92 and the screw 91 adjusted by any suitable means, herein a hand wheel, until when the center 92 is in engagement with the rear end of the broach the lever 78 is in vertical position. The traction screw may be then started in operation and as a result the entire frame will be moved toward the left, the lever, owing to its central pivoting, transmitting the pull of the traction screw uniformly to the opposite ends of the broach and thereby providing all the advantages which are obtained in the prior described forms of my invention.

It will be evident that in all three forms of my invention disclosed in this application, means is provided which is readily attachable to a standard type of broaching machine and which when so applied will permit the force used in moving a broach to be evenly divided between the push and pull and so the tendency to the breakage of broaches will be greatly reduced and also possibility of the broaches getting out of alinement will be eliminated.

While I have in this application specifically described three forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A broaching machine comprising a single member operative upon translatory movement to cause a broach to traverse a work piece, and means for connecting said member to the opposite ends of a broach including equalizing means whereby the force to move the broach through the work piece may be equally divided between a push and a pull.

2. A broaching machine comprising a broach, carrying means connected with the opposite ends thereof, a single member cooperating with said carrying means and operative on translatory movement to cause said broach to traverse a work piece, and fluid pressure equalizing means interposed between said member and said carrying means through which the force to move the broach through the work piece is equally divided between a push and a pull.

3. A broaching machine comprising a single member operative upon translatory movement to cause a broach to traverse a work piece, relatively movable members connected to the opposite ends of a broach, and means including mechanism for equalizing the stresses transmitted thereto for connecting said last mentioned members to said first mentioned member for movement thereby.

4. A broaching machine comprising a single member operative upon translatory movement to cause a broach to traverse a work piece, relatively movable members connected to the opposite ends of a broach end, and means including fluid pressure mechanism for automatically imparting equal forces thereto for connecting said last mentioned members to said first mentioned member for movement thereby.

5. A broaching machine comprising a broach carrying carriage comprising relatively movable elements operatively connectible to the opposite ends of a broach, a member movable longitudinally to impart force to said carriage to move it longitudinally, and means interposed between said member and carriage for transmitting said force equally to said elements.

6. An attachment for a traction screw type broaching machine comprising a broach carrying frame including relatively movable elements adapted to engage opposite ends of a broach, means including equalizing mechanism for connecting said elements for simultaneous movement in the same direction and for transmitting motive force equally thereto, and means for connecting said first mentioned means to the screw of said broaching machine for traction thereby.

7. An attachment for a traction screw type broaching machine comprising a broach carrying frame including relatively movable elements adapted to engage opposite ends of a broach, means for connecting said elements for simultaneous movement in the same direction including pistons connected to said elements and interconnected cylinders for said pistons constituting means for transmitting motive force equally thereto, and means for connecting said first mentioned means to the screw of said broaching machine.

8. In combination, a frame comprising relatively movable elements adapted to engage the opposite ends of a broach, alined pistons connected to said elements, alined fixedly spaced cylinders in which said pistons are reciprocable, passage means connecting the homologous ends of said cylinders, one end of each of said cylinders and the communicating passage being filled with relatively incompressible fluid, and means for imparting a force to said cylinders to move them in a direction tending to compress said fluid during cutting operation of said broach.

9. In combination, a broach, carrying means cooperating with the opposite ends of said broach including draft equalizing mechanism movable as a whole with said carrying means and imparting equal pushing and pulling forces to the opposite ends of said broach in the same direction and for automatically maintaining said forces substantially equal, and means for applying power to said first mentioned means.

10. A broaching machine comprising a broach, carrying means engaging the ends of said broach, and actuating means for transmitting tractive power to said carrying means including means for simultaneously subjecting the broach to compression and tension stresses during its working stroke, said means including fluid pressure governed couplings in said carrying means for substantially equalizing said stresses.

11. A broaching machine comprising a broach, mechanically actuated means for causing relative movement between said broach and a work piece, and means connecting said broach to said actuating means for movement thereby including fluid pressure governed stress equalizing means.

12. A machine tool comprising a movable member, carrying means therefor, mechanical actuating means for causing movement of the carrying means, and stress equalizing means for causing said member to move bodily with said actuating means interposed between said member and said actuating means including a plurality of fluid cylinders and pistons therein.

13. A broaching machine comprising a broach, mechanically actuated means for causing relative movement between said broach and a work piece, and stress equalizing means connecting said broach to said actuating means including a plurality of fluid containing cylinders and pistons therein, and means whereby fluid may flow from one cylinder to another.

14. A broaching machine comprising a broach, means for supporting both ends of the same, a single translatively movable actuating means for causing relative movement between said supporting means and a work piece whereby a working stress may be induced in said broach, and equalizing means between said supporting means and actuating means whereby both of said supporting points transmit some of the actuating force for said broach.

15. A broaching machine comprising a broach, carrying members connected to the opposite ends of said broach, a crosshead provided with means to support one end of each of said carrying members, means to move said crosshead, and stress equalizing means carried by said crosshead and acting to transmit equal actuating stresses through said supporting means.

16. A broaching machine comprising a broach, a plurality of relatively adjustable carrying members connected to the opposite ends of said broach, a crosshead provided with means to support one end of each of said carrying members, means to move said crosshead, and stress equalizing means carried by said crosshead and acting to transmit equal actuating stresses through said supporting means.

17. A broaching machine comprising a broach, a plurality of carrying members connected at opposite ends thereof, a crosshead having cylinders therein, said members having pistons at one of their ends reciprocable in said cylinders, and means whereby fluid can pass from one cylinder to the other to equalize pressure on each of said pistons.

18. A machine tool comprising a work performing member to be actuated, and means for actuating the same including telescopically arranged fluid operated members respectively engaging opposite ends of said work performing member.

19. A machine tool having a pair of bodily movable fluid cylinders and pistons therein, means whereby fluid will flow from one cylinder to the other when the pistons are moved relatively to each other, and a work performing member having opposite ends carried by members constituting extensions of said pistons respectively.

20. A machine tool comprising a member having a pair of cylinders and pistons therein, each of said pistons having a piston rod extending from said member in the same direction, and means carried by the respective rods for engaging opposite ends of a working tool.

21. In a machine tool, a slidable crosshead, means for applying power for moving it, means for communicating the movement of the crosshead to a working tool, and fluid pressure equalizing means carried by said crosshead and interposed between the power applying and power communicating means.

22. A machine tool having tool supporting members and tool actuating means comprising a plurality of substantially parallel rods, and a movable crosshead carrying one of said members, one end of each of said rods being operatively connected to said crosshead through power equalizing means and the other end of said rods being operatively connected with another of said tool supporting members.

23. A machine tool comprising a tool, a support and actuating means therefor including bodily movable fluid cylinders having axially alined pistons and piston rods therein, means whereby said piston rods are mechanically connected, and means for supporting opposite ends of the tool on piston rods belonging to different cylinders.

24. A machine tool comprising a tool, and supporting and actuating means therefor including substantially adjacent fluid cylinders and pistons therein each of different diameters, and means for supporting the opposite ends of the tool through carrying means on the pistons of the respective cylinders.

25. A machine tool comprising a tool, and supporting and actuating means therefor including a plurality of substantially axially alined fluid cylinders and pistons therein each of different diameters, concentrically arranged rods extending from the pistons, and means on said rods for engaging opposite ends of the tool.

In testimony whereof I affix my signature.

OMER J. DANSEREAU.